July 3, 1934.　　　　　G. A. LYON　　　　　1,965,530
METHOD OF AND APPARATUS FOR ATTACHING BEADING TO TIRE COVERS
Filed Aug. 26, 1931　　　2 Sheets-Sheet 1
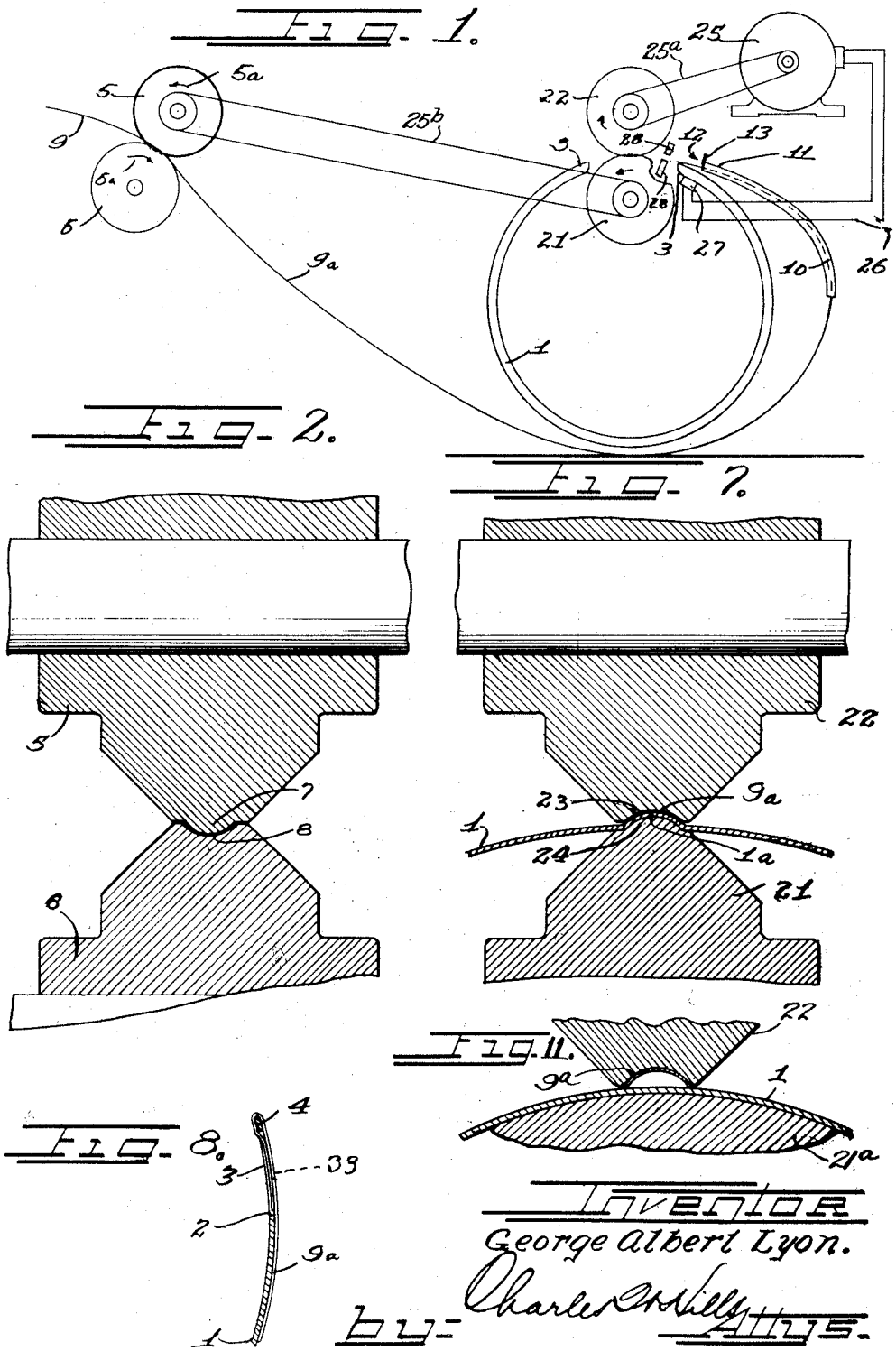

July 3, 1934.  G. A. LYON  1,965,530
METHOD OF AND APPARATUS FOR ATTACHING BEADING TO TIRE COVERS
Filed Aug. 26, 1931   2 Sheets-Sheet 2

Inventor
George Albert Lyon.
By Charles W. Hills
Attys.

Patented July 3, 1934

1,965,530

UNITED STATES PATENT OFFICE 1,965,530

METHOD OF AND APPARATUS FOR ATTACHING BEADING TO TIRE COVERS

George Albert Lyon, Allenhurst, N. J., assignor to Lyon Incorporated, Asbury Park, N. J., a corporation of Delaware Application August 26, 1931, Serial No. 559,389

17 Claims. (Cl. 113—1)

This invention has to do with molding or beading for tire covers, particularly of that character embodying an outer ring or rim for overlying the tread of a tire.

One of the principal objects of this invention resides in a novel method by which molding or beading is secured to a tire cover rim of the character referred to.

Another object of the invention resides in a method by which the tire cover member is preformed for the reception of molding or beading.

A further object of the invention resides in a method by which molding or beading is applied to tire covers successively with a minimum loss of time.

A further object of the invention resides in the provision of an improved method by which a continuous strip of beading or molding is secured to one or successive tire covers.

In carrying out the invention into practice, there is provided a pair of co-operating forming rolls, adjacent which the poles of a spot welding apparatus are positioned. The rimlike tire cover is provided adjacent its ends with openings and is then positioned so that it straddles the rolls with one end of the cover adjacent said rolls. Beading or molding in a continuous strip is led from a suitable source of supply through another pair of forming rolls and is given a substantially arcuate cross sectional shape, and is thereupon led through a suitable guide until its end is adjacent the last mentioned end of the cover. The end of the beading is thereupon doubled upon itself and upon the end of the tire cover member, the doubled over portions being spot welded by the poles to form a closed loop. The said end is then positioned between the first set of forming rolls, the latter being set into motion automatically by the cover member and the cover member is progressed, the rolls forming a longitudinal rib in the cover member and at the same time forcing the molding about the rib. Rotation of the rolls ceases when the other end of the cover member is somewhat spaced from the poles of the welding apparatus, at which time the strip of beading is cut off so that it extends beyond the end of the tire cover. The projecting end of the beading is then doubled upon itself as in the first instance and spot welded in position in the same manner. The first set of rolls is then again put in motion to properly form the remainder of the rib and force the remainder of the beading on the rib, whereupon another tire cover member may be positioned to pass through the same cycle.

Further objects and advantages of the invention will appear as the description proceeds.

Figure 1 shows diagrammatically an arrangement for carrying out the process forming the subject matter of the present invention.

Figure 2 is an enlarged fragmentary sectional view of a cooperating pair of forming rolls for the beading to be applied to a tire cover.

Figure 7 is a view similar to Figure 2 but showing another set of forming rolls employed in forming a rib integral with the tire cover and applying a strip of beading or molding thereto.

Figure 8 is a view, partly in section and partly in elevation, showing the location of the end of the beading in relation to the opening adjacent the end of the tire cover on which the beading is mounted.

Figure 11 is a fragmentary view similar to Figure 7 but showing a modified form of the invention.

Figure 9:
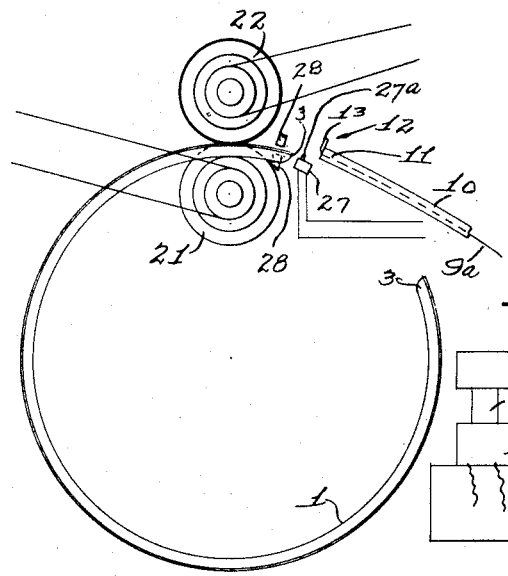
Figure 9 is a view similar to Figure 1, certain parts being omitted, showing the relationship of the parts just prior to completion of the beading-applying process.

Referring now more particularly to the drawings, wherein the same reference characters are applied throughout to the same parts, the numeral 1 indicates a preferably metallic tire cover in the form of a split ring or rim. For the purpose of the present invention, the member 1 is preliminarily cut out at 2 adjacent its ends 3 to provide anchor portions 4 integral with the member 1. A pair of cooperating male and female forming rolls 5 and 6 provided respectively with a circumferential transversely arcuate rib 7 and groove 8 are connected by gearing (not shown) or in any other suitable way to be rotated from a suitable source in the directions indicated by the arrows 5a and 6a. These rolls are arranged so that the cooperating rib and groove portions are separated by substantially the thickness of the strip 9 of beading or molding, and the rib, groove and strip have substantially the same transverse dimensions. The strip is preferably of sheet metal of the general character used in steel tapes and the like, and in passing between the rolls 5 and 6 is given an arcuate cross-sectional shape corresponding with that of the rib 7 and groove 8 as indicated at 9a. After being thus formed, the strip 9a passes through a guide 10 at the forward end 11 of which is arranged a shearing apparatus 12 for severing the strips into the desired lengths corresponding with the lengths of the members 1 to which the strips are to be secured.

The shearing apparatus is shown for illustrative purposes only as comprising a blade 13 on one end of a lever 14 pivoted at 15 to a bracket 16. The other end 17 of the lever 14 is constantly urged by a spring 18 in a direction to draw the blade 13 away from the strip 9a. The shear blade 13 is actuated at predetermined times by any suitable means such as the electric device herein illustrated and comprising a core 19 and cooperating solenoid 20 engageable with the end 17 of the lever 14.

A second pair of forming rolls 21 and 22, connected for rotation by gearing (not shown) or otherwise and similar to but reversed in transverse peripheral shape with respect to the rolls 5 and 6, are provided for simultaneously forming a circumferential rib 1a on the tire cover 1, and forcing the strip 9a thereover. The female roll 22 has a peripheral groove 23 somewhat wider than the groove 8 in the female roll 6, and the rib 24 on the male roll 21 is of corresponding width. The cooperating portions of the rib 24 and groove 23 are spaced apart a distance substantially equal to the combined thickness of the strip 9a and the tire cover 1 so that when these two parts pass between the rolls, a circumferential rib 1a is formed on the tire cover 1, and the strip 9a is forced into tight engagement with the same.

The radius of transverse curvature of the convex surface of the rib 1a is somewhat greater than that of the concave surface of the strip 9a so that when the latter is forced onto the rib, the strip is flattened somewhat in a transverse direction. This flattening results in a tensioning of the strip so that the edges of the latter exert a certain degree of pressure upon the corresponding edge portions of the rib 1a in the tendency of the first mentioned edges to assume their normal positions. The tire cover member 1 being substantially round or arcuate and the strip 9a being normally substantially straight in a longitudinal direction, any tendency of the strip to buckle as it is caused to assume the longitudinal curvature of the rib 1a is overcome by the fact that the strip is somewhat flattened transversely when it is applied to the rib 1a, and also for the reason that the action of the rolls 21 and 22 causes a certain amount of longitudinal tension in the strip.

The various rolls are rotated from any suitable source, such as a motor 25, connected to the roll 22 by a belt 25a, the rolls 5 and 21 also being connected by a belt 25b. Operation of the motor is controlled by a hand switch 26 and a second switch 27 in series therewith. The switch 27 includes a plunger 27a which is normally held in and is constantly pressed toward circuit-opening position by a spring 27b. The showing of these switches is substantially diagrammatic, and their details may be varied as desired.

Figure 3:
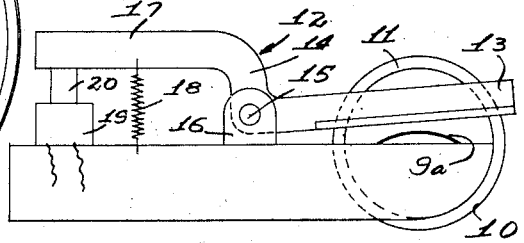
Figure 3 illustrates in diagrammatic elevation an electrically operated shearing device to be used in connection with the beading.

Between the switch 27 and the rolls 21 and 22 are arranged the poles 28 of a spot welding apparatus 29, the poles being constantly urged toward each other by a spring 30, and maintained at predetermined intervals in spaced apart relation by the action of a core 31 upon a solenoid 32, in a manner similar to that in connection with the shearing apparatus illustrated in Figure 3.

Figure 4:
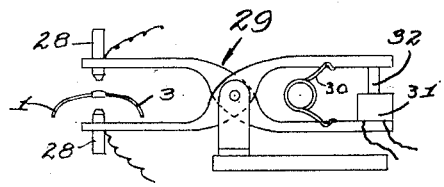
Figure 4 is a diagrammatic elevational view of a spot welding apparatus by which the beading is secured to the tire cover.
Figure 5:
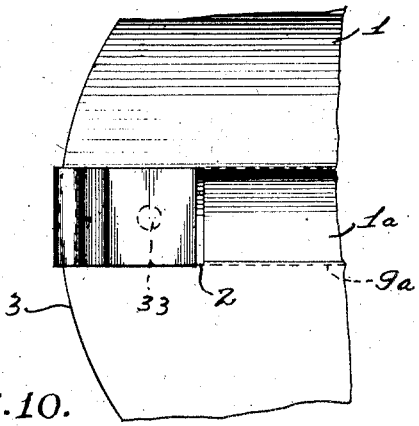
Figure 5 is an enlarged rear elevational view of one end of a tire cover showing the manner in which the beading is secured thereto.
Figure 6:
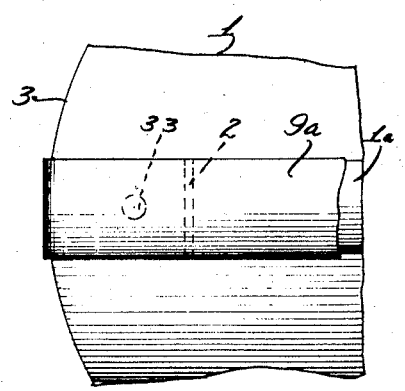
Figure 6 is a view similar to Figure 5 showing the front of the tire cover.
Figure 10:
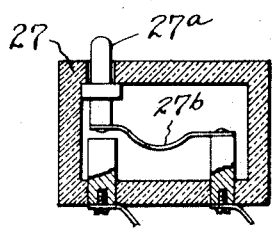
Fig. 10 is an enlarged sectional detail view of a switch of the invention.

The operation of the foregoing construction is as follows:

The free end of the flat strip 9 is led between the forming rolls 5 and 6, which, upon rotation, impart to the strip 9 an arcuate cross-sectional shape as indicated at 9a. This is continued until the strip 9a passes through the guide 10 and extends somewhat beyond the forward end 11 thereof. Inasmuch as the rolls 5 and 6 are preferably controlled in their rotation by the motor 25, the circuit containing the switches 26 and 27 should be closed in order to progress the strip 9a through the guide 10. This closing of the circuit may be accomplished by allowing one end of the cover 1 to rest on and thereby depress the spring pressed plunger 27a into circuit closing position as shown in Figure 1, and manually closing the switch 26. When the free end of the strip 9a projects beyond the forward end 11 of the guide 10 a predetermined amount, the hand switch 26 is opened to thereby stop the rolls 5 and 6 and consequent movement of the strip 9a. The free end of the strip 9a projecting beyond the guide 10 is preferably of such length as to permit its being doubled upon itself as shown in Figure 8 to occupy the cutout 2 in the corresponding end of the cover member 1 as seen in Figure 8. Any suitable tool such as a pair of pliers (not shown) may be employed for this purpose. The cover 1 is then shifted manually or otherwise sufficiently to bring the doubled over portions of the strip 9a associated with the cutout 2 between the poles 28 of the spot welding apparatus, whereupon the latter is operated to spot weld the doubled over portions of the strip 9a together as shown by the dotted lines at 33 in Figures 5, 6 and 8. A suitable source of electric energy may be applied to the spot welding apparatus 29 for this purpose. The arrangement of the various parts before and after the spot welding operation takes place is shown diagrammatically in Figure 4. After the spot welding operation, the cover 1 is further shifted manually or otherwise until the end just referred to is ready to enter between the rolls 21 and 22. The switch 27 remains closed by reason of the weight of the portion of the cover resting on the spring pressed plunger 27a thereof, and the hand switch 26 is thereupon closed, thereby causing the motor 25 to rotate the various rolls. The peripheral speed of the various rolls is substantially the same so that the cover 1 and strip 9a properly progress between the rolls 21 and 22 together.

As above explained, the rib 1a is formed on the tire cover 1, preferably though not necessarily at its center, as the member 1 passes between the rolls 21 and 22, and the strip 9a is somewhat flattened transversely in its engagement with the convex surface of the rib 1a, with the result that the strip 9a is prevented from buckling due to the longitudinal curvature imparted to the strip and at the same time is caused to tightly engage the sides of the rib. The tire cover and strip are progressed simultaneously by the rollers 21 and 22 until the cover reaches the position shown in Figure 9, in which the spring pressed plunger 27a of the switch 27 is shown in circuit opening position. That is, as soon as the cover passes beyond the plunger 27a and frees the latter, the circuit is opened and the motor 25 stopped. The rolls 5, 6, 21 and 22 accordingly also stop, and the adjacent end of the cover is disposed sufficiently forward of the forward end 11 of the strip guide 10 so that the strip projects beyond the end of the cover a certain distance. The blade 13 is then actuated, and this actuation may be manual, consequent upon operation of a manual switch, or if desired, the plunger 27a could be connected in circuit with the wiring for the shearing apparatus so that when the plunger 27a is withdrawn to the position shown in Figure 9, the shearing apparatus operating circuit can be closed for the moment necessary to cut off the strip at the forward end of the guide 10, the end of the strip thus cut off is thereupon bent over the edge of the end portion of the cover and is folded upon itself to the position shown in Figure 8 so that it is substantially looped about the anchorage 4. The cover 1 is then positioned so that the poles 28 of the welding apparatus are aligned with the cut-out 2 at the end of the cover 1, and the core 31 is energized to thereby weld the portions of the strip which are overlapped together. The core 31 is thereupon deenergized to withdraw the poles 28 whereupon the switches 26 and 27 are closed to cause the motor 25 to rotate the rolls 21 and 22 and thereby complete the operation of forming the rib 1a and forcing the remaining portion of the strip thereon. Inasmuch as the application of the strips is almost completed at the time that the second end of the strip is secured to the corresponding end of the cover 1, said end of the strip is fastened in position without any appreciable reduction in the tension of the strip about the rib 1a.

It will be appreciated that the apparatus herein disclosed is for the most part diagrammatic, and is merely illustrative of one of any number of apparatuses which may be employed for carrying out my novel method. The application of molding in accordance with this invention is not limited to split ring covers, but may be employed in connection with a continuous ring, in which event some suitable anchorage means will be provided for the ends of the strips.

I am aware that many changes may be made and numerous details of construction may be varied through a wide range without departing from the principles of this invention, and I, therefore, do not purpose limiting the patent granted hereon otherwise than necessitated by the prior art.

If desired, formation of the rib 1a could be dispensed with and a strip of the same or other thickness than that used in connection with the rib could be employed. In such event, the roll 21 could be replaced by a roll 21a having a transverse peripheral shape corresponding with that of the cover member 1 to support the same while the female roll 22 forces the strip 9x tightly about the member 1, the other instrumentalities of the above described apparatus being retained.

I claim as my invention:

1. The method of attaching a strip of molding to a tire cover, comprising the steps of imparting to a flat strip of molding a transversely arcuate shape, forming openings adjacent the ends of the tire cover to provide anchorages, looping an end of the strip about one anchorage, spot welding the contiguous portions of the loop together, simultaneously forming in the tire cover a rib of less transverse curvature than that of the strip, and forcing the strip about the rib to a point short of the other anchorage, cutting off the strip at a point beyond the other anchorage, looping the projecting portion of the strip about said other anchorage, spot welding said projecting portion to the body of the strip, and completing the forming of the rib in the tire cover and the forcing of the strip thereagainst.

2. The method of attaching a strip of molding to the periphery of a ring-like tire cover, comprising the steps of securing an end of the strip to an end of the cover, simultaneously forming a longitudinal rib in the cover and forcing the strip to tightly embrace said rib, and securing the other end of the strip to the other end of the cover while the strip tightly embraces the rib.

3. The method of attaching a strip of molding or beading to a tire cover, which comprises the steps of forming a strip of molding of the periphery of a ring-like length in excess of the length of the periphery of the cover, imparting to the strip a transversely arcuate shape, attaching one end of the strip to the tire cover, simultaneously forming a transversely arcuate rib in and along the tire cover periphery and forcing the strip to embrace said rib, and securing the other end of the strip to the cover adjacent the corresponding end of the rib.

4. In an apparatus for applying a strip of molding or beading to a tire cover, a pair of cooperating rolls having transversely arcuate mating peripheral rib and groove portions, whereby to impart a substantially arcuate transverse shape to a strip of molding passing between said rolls, a second pair of cooperating male and female rolls having coacting transversely arcuate groove and rib portions of less curvature than the first mentioned portions, a motor associated with said rolls for rotating the same, an electric circuit including a switch for controlling said motor, said switch being controlled by a spring pressed plunger normally in circuit opening position, said switch providing a support for a tire cover and being closed when so supporting the cover, a guide for conducting the strip into juxtaposition with the cover when the latter is supported by said switch, electrically operated means associated with the forward end of said guide for shearing the strip into predetermined lengths, and a spot welding apparatus for securing the ends of the strip to the cover respectively before and after substantially the entire cover passes between the second pair of rolls for the formation of a rib on the cover.

5. In an apparatus for attaching a strip of molding to a tire cover, a pair of cooperating male and female rolls for imparting a substantially concavo-convex cross-section to a strip of molding, a second pair of cooperating male and female rolls for forming a similar but more shallow rib in a tire cover and compressing the strip on the rib, and welding instrumentalities on opposite sides of the path of movement of the cover toward said second set of rolls and operable to secure the ends of the strip to the tire cover prior to passage between the second pair of rolls.

6. The method of attaching a strip of molding to a ring-like tire cover or the like, comprising the steps of simultaneously forming a longitudinal rib in the tire cover and compressing the strip about the rib, and securing the ends of the strip to the cover.

7. In an apparatus for applying a strip of molding to a tire cover, a pair of cooperating male and female forming rolls for producing a rib in a tire cover, a motor for rotating said rolls, a double switch controlled electric circuit for said motor, one of said switches including a spring pressed plunger normally urged to switch opening position and providing a support for said plunger, said plunger being depressed into switch closing position when said switch supports the cover, and means for securing a strip of molding to the cover before entry of the latter between said rolls, whereby, when the cover is positioned to enter between the rolls and the other switch closed, the said rolls will be rotated to progress the cover and strip together therethrough, thereby simultaneously forming a longitudinal rib in the cover and compressing the strip thereagainst until the other end of the cover moves off the switch provided with the spring pressed plunger, which plunger will be caused by its spring to open the circuit and stop the rolls, whereupon the securing means is employed to secure the strip to the other end of the cover, the circuit closed by hand pressure upon the plunger, and the formation of the rib completed by further rotation of the rolls.

8. In an apparatus for applying a strip of molding to a tire cover, a pair of cooperating male and female forming rolls for producing a rib in a tire cover, a motor for rotating said rolls, a double switch controlled electric circuit for said motor, one of said switches including a spring pressed plunger normally urged to switch opening position and providing a support for said plunger, said plunger being depressed into switch closing position when said switch supports the cover, means for securing a strip of molding to the cover before entry of the latter between said rolls, whereby, when the cover is positioned to enter between the rolls and the other switch closed, the said rolls will be rotated to progress the cover and strip together therethrough, thereby simultaneously forming a longitudinal rib in the cover and compressing the strip thereagainst until the other end of the cover moves off the switch provided with the spring pressed plunger, which plunger will be caused by its spring to open the circuit and stop the rolls, whereupon the securing means is employed to secure the strip to the other end of the cover, the circuit closed by hand pressure upon the plunger, and the formation of the rib completed by further rotation of the rolls, and means for severing the strip into lengths corresponding with successive tire covers.

9. In an apparatus for applying a strip of molding or beading to a tire cover, means for rolling the strip into a transversely arcuate form, means for simultaneously rolling a transversely arcuate rib of less curvature in a tire cover and compressing the strip thereabout, and means for uniting the ends of the strip with the cover.

10. In an apparatus for applying a strip of molding or beading to a tire cover, means for rolling the strip into a transversely arcuate form, means for simultaneously rolling a transversely arcuate rib of less curvature in a tire cover and compressing the strip thereabout, means for uniting the ends of the strip with the cover, and a device for shearing the strip into lengths to correspond with successive tire covers.

11. In an apparatus for applying a strip of molding or beading to a tire cover, means for rolling the strip into a transversely arcuate form, means for simultaneously rolling a transversely arcuate rib of less curvature in a tire cover and compressing the strip thereabout, and means for uniting the ends of the strip with the cover, said uniting means being disposed between the first two means whereby to unite the ends of the strip with the cover prior to rolling of the same by the second means.

12. The method of attaching a strip of molding to the outer periphery of a ring-like tire cover, comprising the steps of imparting to the strip a concavo-convex transverse shape, securing an end of the strip to said periphery, rolling a concavo-convex rib in said periphery and compressing the strip thereon, and at the same time continuing to shape and feed the strip to be compressed.

13. In an apparatus for applying a strip of molding or beading to an arcuate tire cover, a pair of cooperating rolls having transversely arcuate mating peripheral rib and groove portions, whereby to impart a substantially arcuate transverse shape to a strip of molding passing between said rolls, a second pair of cooperating male and female rolls having coacting transversely arcuate groove and rib portions of less curvature than the first mentioned portions, a motor associated with all of said rolls for rotating the same, an electric circuit including a switch for controlling said motor, said switch being controlled by a spring-pressed plunger normally in circuit-opening position, said switch providing a support for a tire cover and being closed when so supporting the cover, a guide for conducting the strip into juxtaposition with the cover when the latter is supported by said switch, means associated with the forward end of said guide for shearing the strip into lengths corresponding with the lengths of the portions of the covers to which such strips are to be attached, and means for securing the ends of each strip to the cover respectively before and after substantially the entire cover passes between the second pair of rolls for the formation of a rib on the cover.

14. The method of attaching a strip of molding to the surface of an arcuate part of a tire cover which consists in feeding the strip to said surface of the cover part, securing one end of the strip to the cover part, rolling the strip progressively about the cover part, contemporaneously tensioning the strip to cause it to be applied in taut condition to the cover part and securing the other end of the strip to the cover part while the strip is taut.

15. The method of attaching a strip of molding to a split arcuate tire cover, comprising the steps of forming an opening adjacent to one end of the cover to provide an anchorage, looping an end of the strip about the anchorage, rigidly uniting said end with the body of the strip so as to close the loop, simultaneously forming a rib and forcing the strip about the rib, and positively securing the other end of the strip to the other end of the cover.

16. In an apparatus for attaching a strip of molding to a tire cover, a pair of cooperating male and female rolls for forming a rib in a tire cover and compressing the strip about the rib, and mechanism adjacent the path of movement of the cover toward said rolls and operable to secure the ends of the strip to the cover prior to passage of the respective ends between said rolls.

17. In an apparatus for attaching a strip of molding to a tire cover, a pair of cooperating male and female rolls for forming a rib in a tire cover and compressing the strip about the rib, and mechanism adjacent the path of movement of the cover toward said rolls and operable to secure the ends of the strip to the cover prior to passage of the respective ends between said rolls, said rolls serving as a support for the cover while said mechanism secures the unrolled ends of the cover and strip together.

GEORGE ALBERT LYON.

CERTIFICATE OF CORRECTION.

Patent No. 1,965,530.             July 3, 1934.

GEORGE ALBERT LYON.

It is hereby certified that error appears in the printed specification of the above numbered patent requiring correction as follows: Page 3, line 96, claim 3, for "a" read the periphery of a ring-like; and lines 97 and 98, same claim, strike out the words "the periphery of a ring-like" and insert the article a; and that the said Letters Patent should be read with these corrections therein that the same may conform to the record of the case in the Patent Office.

Signed and sealed this 9th day of October, A. D. 1934.

Leslie Frazer

(Seal)             Acting Commissioner of Patents.